(12) United States Patent
Zebian

(10) Patent No.: US 11,293,348 B2
(45) Date of Patent: Apr. 5, 2022

(54) TURBOMACHINE FITTED WITH A THERMO-ACOUSTIC SYSTEM

(71) Applicant: Airbus Operations SAS, Toulouse (FR)

(72) Inventor: Maxime Zebian, Saint-Sauveur (FR)

(73) Assignee: Airbus Operations SAS, Toulouse (FR)

( * ) Notice: Subject to any disclaimer, the term of this patent is extended or adjusted under 35 U.S.C. 154(b) by 160 days.

(21) Appl. No.: 16/574,946

(22) Filed: Sep. 18, 2019

(65) Prior Publication Data

US 2020/0122852 A1   Apr. 23, 2020

(30) Foreign Application Priority Data

Oct. 19, 2018   (FR) ........................ 1871234

(51) Int. Cl.
*F02C 7/14*   (2006.01)
*F02C 7/24*   (2006.01)
(Continued)

(52) U.S. Cl.
CPC .................. *F02C 7/14* (2013.01); *F02C 7/24* (2013.01); *F02K 1/827* (2013.01); *F02K 3/06* (2013.01);
(Continued)

(58) Field of Classification Search
CPC ......... F05D 2260/208; F05D 2260/213; F05D 2260/96; F05D 2260/964; F28D 15/00–02; F28D 15/0233; F28D 15/0266; F28D 15/0275; F28D 15/04; F28D 15/043; F02C 7/185; F02C 7/045; F02C 7/047; F02K 3/115; F02K 1/822; F02K 1/827; B64D 2033/0233; B64D 2033/024; B64D 2033/0206
See application file for complete search history.

(56) References Cited

U.S. PATENT DOCUMENTS 9,909,448 B2 *   3/2018   Gerstler .................. F01D 25/18
10,443,499 B2 *  10/2019   Snyder ..................... F02C 7/16
(Continued)

FOREIGN PATENT DOCUMENTS

EP   3038101 A1   6/2016
EP   3244039 A1   11/2017

OTHER PUBLICATIONS

French Search Report, priority document.

*Primary Examiner* — Stephanie Sebasco Cheng
(74) *Attorney, Agent, or Firm* — Greer, Burns & Crain, Ltd.

(57) ABSTRACT

A turbomachine for an aircraft comprising a thermo-acoustic system associated with a fluid circuit allowing the turbomachine engine to be supplied with fluid, the thermo-acoustic system comprising an exchanger connected to the fluid circuit and through which the fluid that is to be cooled passes, an acoustic noise-attenuation structure forming, in full or in part, a wall of the duct of a fan duct, the structure being situated some distance from the exchanger, and a pulsating heat pipe comprising a tube extending between the exchanger and the acoustic noise-attenuation structure, the tube having a serpentine form with a plurality of elbows bent over at 180° housed alternately in the exchanger and the structure.

10 Claims, 5 Drawing Sheets

(51) Int. Cl.
*F02K 1/82* (2006.01)
*F02K 3/06* (2006.01)
(52) U.S. Cl.
CPC .. *F05D 2260/208* (2013.01); *F05D 2260/213* (2013.01); *F05D 2260/96* (2013.01)

(56) References Cited

U.S. PATENT DOCUMENTS

| | | |
|---|---|---|
| 10,676,205 B2* | 6/2020 | Niergarth ............... B64D 27/24 |
| 2009/0317238 A1* | 12/2009 | Wood .................... F01D 25/162 |
| | | 415/119 |
| 2013/0239542 A1* | 9/2013 | Dasgupta ............... B64D 33/10 |
| | | 60/39.093 |
| 2014/0165570 A1* | 6/2014 | Herring .................... F02C 7/14 |
| | | 60/730 |
| 2016/0017810 A1 | 1/2016 | Lord et al. |
| 2017/0159566 A1 | 6/2017 | Sennoun et al. |
| 2019/0204010 A1* | 7/2019 | Breeze-Stringfellow ................... |
| | | F28F 1/22 |

* cited by examiner

TURBOMACHINE FITTED WITH A THERMO-ACOUSTIC SYSTEM

CROSS-REFERENCES TO RELATED APPLICATIONS

This application claims the benefit of the French patent application No. 1871234 filed on Oct. 19, 2018, the entire disclosures of which are incorporated herein by way of reference.

FIELD OF THE INVENTION

The present invention relates to an aircraft turbomachine equipped with a thermo-acoustic system for cooling the fluids needed for the operation of the turbomachine and for deadening the noise emitted during said operation.

BACKGROUND OF THE INVENTION

A bypass turbomachine has a fan duct through which the air blown by the fan of the turbomachine passes to ultimately be ejected at the exhaust of the turbomachine. The fan duct is delimited by walls which duct the air. These walls are formed of acoustic noise-attenuation structures which attenuate the sound waves generated by the flowing of the air through the fan duct and thus make it possible to deaden the noise of the turbomachine.

The walls may also be fitted with heat exchangers used to perform an exchange of heat between the air circulating in the fan duct and pipes transporting flammable fluids used in the operation of the turbomachine (oil, aviation fuel), so as to cool the latter.

Now, installing heat exchangers in the walls of the fan duct decreases the surface area assigned to acoustic treatment and therefore the ability of the acoustic treatment to deaden the noise of the turbomachine.

In order to resolve this problem, documents EP3038101 and US2016/017810 disclose a thermo-acoustic system comprising an acoustic noise attenuating structure in which pipes transporting fluids that are to be cooled are arranged. The acoustic noise attenuating structure comprises perforations allowing the air of the fan duct to enter its thickness in order to cool the pipes and therefore the fluids.

SUMMARY OF THE INVENTION

One of the objectives of the present invention is to find an alternative solution to the thermo-acoustic system of the type described hereinabove.

BRIEF DESCRIPTION OF THE DRAWINGS

The abovementioned features of the invention, together with others, will become more clearly apparent from reading the following description of one exemplary embodiment, the description being given in connection with the attached figures, among which.

DETAILED DESCRIPTION OF THE PREFERRED EMBODIMENTS

Figure 1:
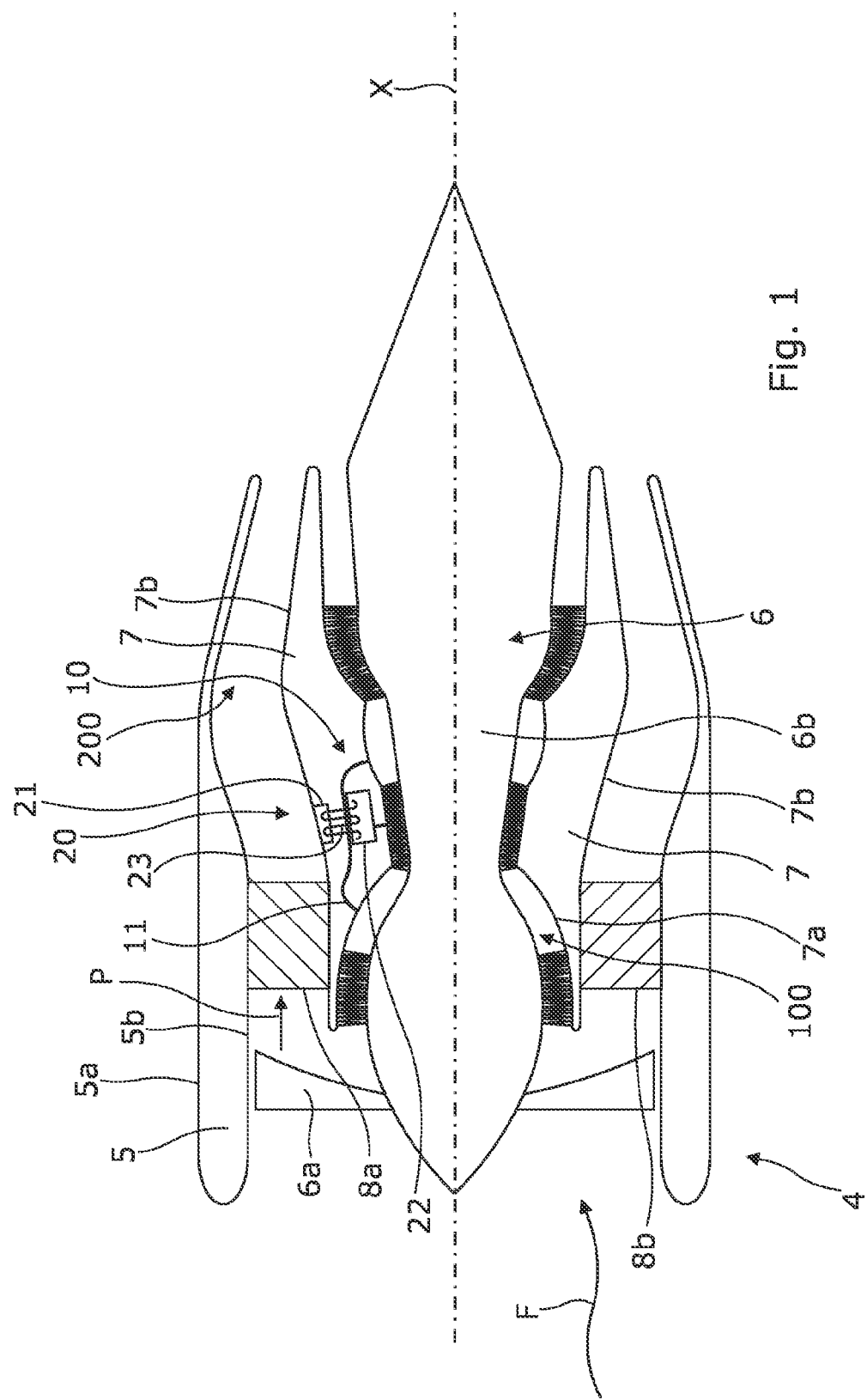
FIG. 1 is a schematic view in section along its longitudinal axis of a turbomachine fitted with a thermo-acoustic system according to one embodiment of the invention.

With reference to FIG. 1, a bypass turbomachine 4 of an aircraft (not depicted) comprises an annular nacelle 5, centered on a longitudinal axis X (referred to as the engine axis) and surrounding an engine 6.

In the direction of flow of a flow of air (arrow F) passing through the turbomachine 4 when the latter is in operation, the engine 6 comprises, from upstream to downstream and centered on the engine axis X, a fan 6a and an engine spool 6b.

The engine spool 6b comprises elements allowing the fan 6a to be made to turn when the engine 6 is in operation. The turbomachine 4 additionally comprises, downstream of the fan 6a, an annular interduct 7 concentric with the spool of the engine 6. The interduct 7 comprises an internal wall 7a which with the engine 6 delimits an annular hot air flow duct 100 which extends along the engine axis X.

The engine 6 is fixed to the nacelle 5 by means of two diametrically opposed forks 8a, 8b which provide the mechanical cohesion of the turbomachine 4 and notably join the nacelle 5 and the interduct 7 to one another.

The nacelle 5 comprises an external wall 5a and an internal wall 5b and constitutes the external shell of the turbomachine 4. The nacelle 5 surrounds the interduct 7 with which it is concentric. The external wall 5a of the nacelle 5 forms the external wall of the turbomachine 4 while the internal wall 5b of the nacelle 5 forms, with the external wall 7b of the interduct 7, the walls of a fan duct 200 which extends along the engine axis X and which takes the majority of the air flow P ejected by the fan 6a when the latter turns. The fan duct 200 extends as far as the rear of the nacelle 5 where the air is ejected.

The turbomachine 4 comprises various fluid circuits 10 for supplying the engine 6 with flammable fluids L (this is not depicted in FIG. 1) that the engine needs for its operation, such as, for example, aviation fuel, oil or hydraulic fluid. Each fluid circuit 10 notably comprises pipes 11 in which the fluid L circulates towards or away from the engine 6 and which are arranged in the thickness of the interduct 7 of the nacelle 5 or of a fork 8a,8b.

It will be noted that FIG. 1 depicts just one fluid circuit 10, in part, by way of example: this is the oil circuit which is arranged in the interduct 7 in order to circulate oil through the engine 6 in order to cool the engine.

Operation of the engine 6 generates a rise in temperature of the fluids L. As is known, the oil extracted from the engine 6 needs to be cooled before it is reinjected into the engine 6, or else the aviation fuel or the hydraulic fluid becomes warm in the environment close to the engine 6 and needs to be cooled. The operation of the engine 6 also generates the emission of undesirable noise caused by the flow of the air flow P in the fan duct 200.

In order to alleviate these disadvantages, the turbomachine 4 comprises a thermo-acoustic system 20 associated with at least one fluid circuit 10 and which is configured to provide acoustic attenuation of the noise emitted during operation of the engine 6 and cooling of the fluid L of the fluid circuit 10.

Figure 2:
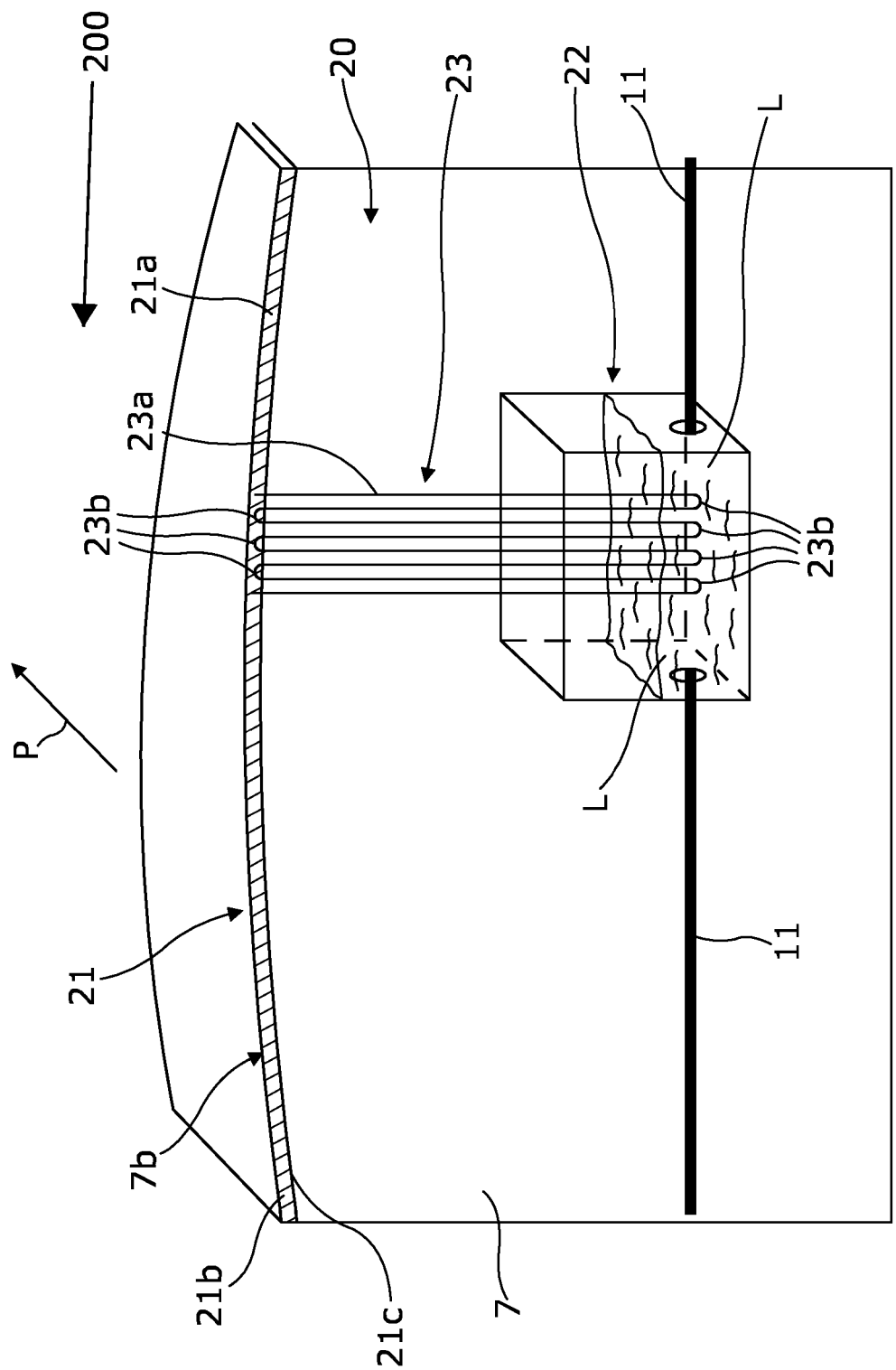
FIG. 2 is a schematic view of the thermo-acoustic system depicted in FIG. 1, the system comprising a pulsating heat pipe connecting an acoustic sound attenuating structure and an exchanger according to one embodiment of the invention.

In connection with FIG. 2, the thermo-acoustic system 20 according to one embodiment of the invention comprises an exchanger 22 connected to a fluid circuit 10 and through which the fluid L that is to be cooled passes, an acoustic noise-attenuation structure 21 forming, in full or in part, a wall 5b, 7b of the duct of the fan duct 200, the structure being situated some distance from the exchanger 22, and a pulsating heat pipe 23 in the shape of a tube 23a extending in a plane (for example a plane parallel or perpendicular to the engine axis X) between the exchanger 22 and the acoustic noise-attenuation structure 21, the tube 23a having a serpentine form with a plurality of elbows 23b bent over at 180° housed alternately in the exchanger 22 and the structure 21.

Figure 3A:
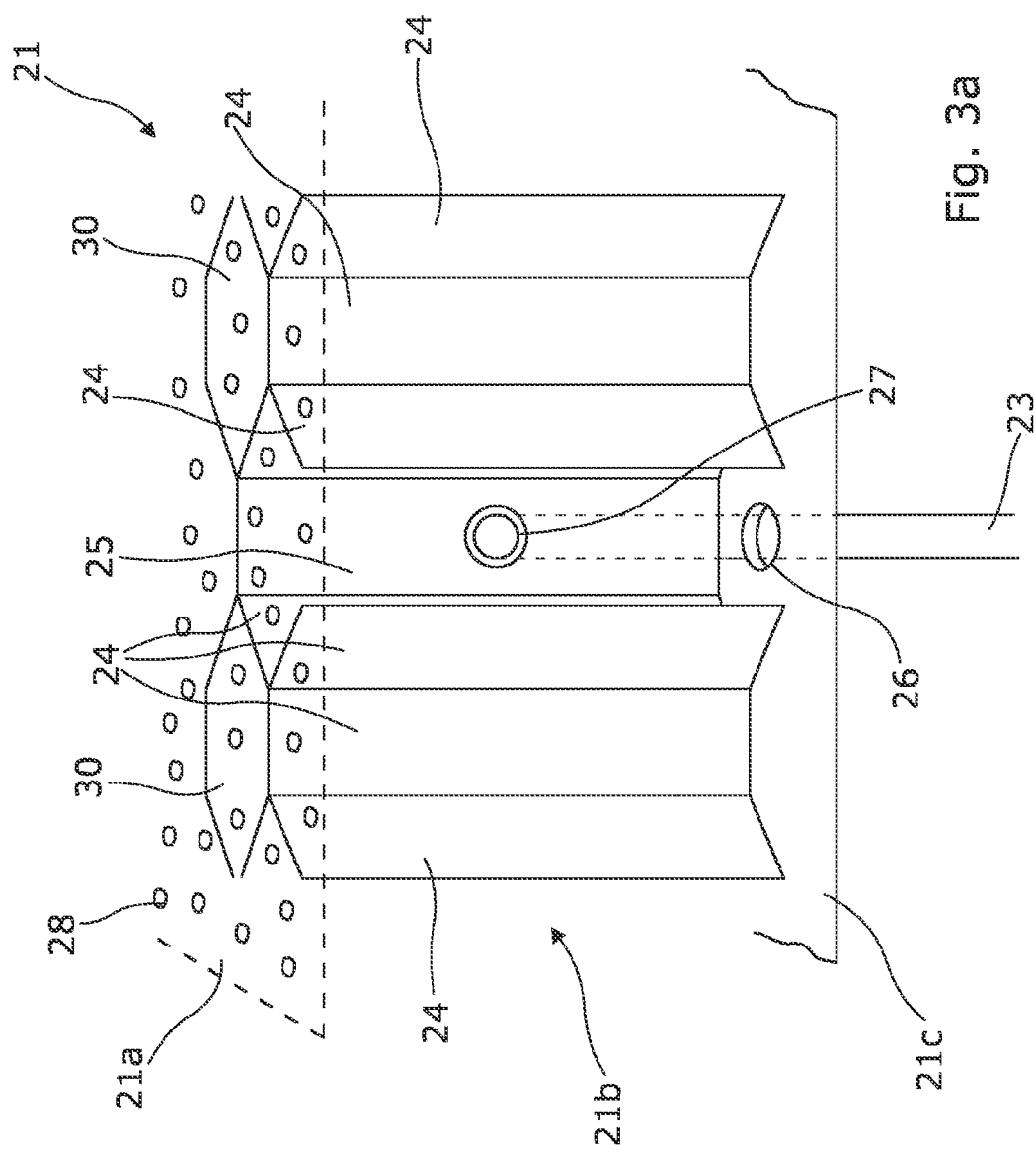
FIG. 3a is a schematic view of an acoustic sound attenuating structure of the thermo-acoustic system of FIG. 2, illustrating a first embodiment of the structure.
Figure 3B:
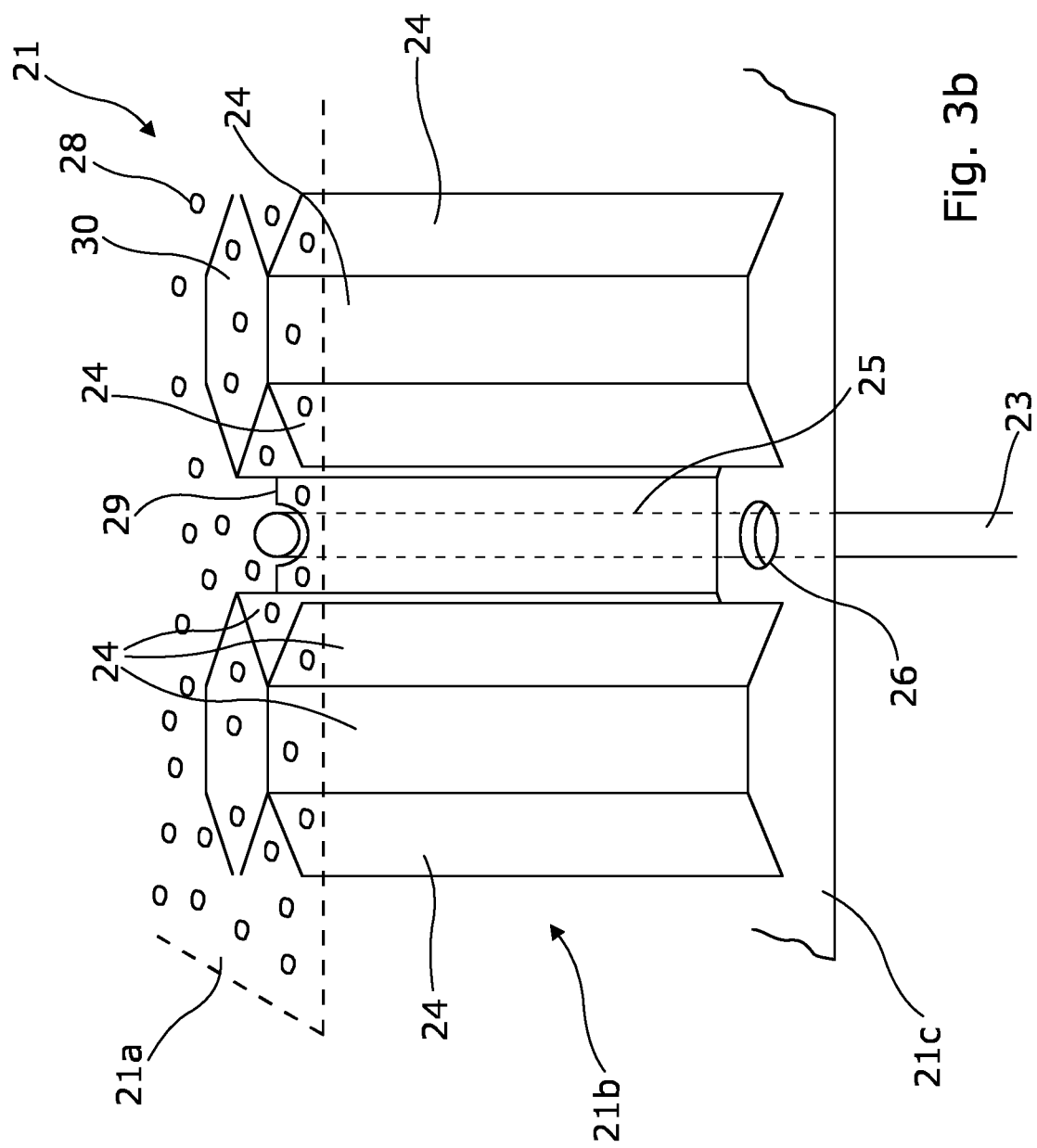
FIG. 3b is a schematic view of an acoustic sound attenuating structure of the thermo-acoustic system of FIG. 2, illustrating a second embodiment of the structure.

In connection with FIGS. 3a and 3b, the acoustic noise-attenuation structure 21 comprises a first panel 21a, a second panel 21c distant from the first panel 21a, and a core 21b interposed between the two panels 21a,21c.

The first panel 21a is directly in contact with the air flow P circulating in the fan duct 200 and has perforations 28 which are dimensioned in such a way that some of the air flow P blown by the fan 6a can enter the core 21b.

The second panel 21c comprises orifices 26 for the passage of the heat pipe 23. The interface between the heat pipe 23 and the second panel 21c at the orifices 26 is sealed by the use of any appropriate means such as, for example, a seal or a barrier coating.

The core 21b is formed by:

a plurality of structural partitions 24 extending between the first and second panels 21a,21c and which are fixed to each of the panels in order to provide the mechanical cohesion of the acoustic noise-attenuation structure 21. The plurality of structural partitions 24 form, with the two panels 21a, 21c, a network of acoustic cavities 30 extending between the two panels 21a, 21c and in which each acoustic cavity 30 communicates with the fan duct 200 via the perforations 28 made in the first panel 21a.

a plurality of support partitions 25 supporting the elbows 23b of the heat pipe 23, which are arranged between the two panels 21a,21c, and support the elbows 23b of the heat pipe 23 that are received in the acoustic noise attenuating structure 21 so as to provide the structural integrity of the elbows+acoustic noise-attenuation structure assembly. A heat pipe supporting partition 25 is, for example, a partition which is fixed to each of the panels 21a, 21c and has an orifice 27 through which the heat pipe 23 passes (see FIG. 3a), or else a partition fixed to the second panel 21c and which has a free edge 29, distant from the first panel 21a, configured to accept the elbow 23b of the heat pipe 23 (see FIG. 3b).

The exchanger 22 is arranged in (the thickness of) the interduct 7, or else in (the thickness of) a fork 8a, 8b.

It will be noted that, in the example depicted in FIGS. 1 to 4, the exchanger 22 and the heat pipe 23 are arranged in the thickness of the interduct 7 and the acoustic noise-attenuation structure 21 forms part of the external wall 7b of the interduct 7.

The exchanger 22 takes the form of a solid having a bottom wall 22a, referred to as the bottom, and a wall forming a cap 22b, referred to as the cap, which are parallel to one another and connected together by four lateral walls 22c, pairs of which are parallel, and all of which are perpendicular to the bottom 22a and to the cap 22b.

In order for the fluid L to flow in the exchanger 22, two lateral walls 22c, preferably facing one another, are each fitted with a fluidic connector 31 allowing a pipe 11 of the fluid circuit 10 with which the exchanger 22 is associated to be connected, and allowing the fluid L to enter or exit the exchanger 22. Thus, the fluid L of the fluid circuit 10, under the action of a pump (not depicted) of the circuit, enters the exchanger 22 via a first fluidic connector 31, circulates through the exchanger 22 in a direction of fluidic circulation defined by the pump, and reemerges from the exchanger 22 via a second fluidic connector 31.

The pulsating heat pipe 23 (also known by the abbreviation "PHP") comprises a capillary tube 23 partially filled with heat-transfer fluid naturally present in two phases, liquid and gas. This phase separation is chiefly the result of the surface-tension forces.

The elbows 23b of the heat pipe 23 which are arranged in the acoustic noise attenuating structure 21 are swept by the air flow P blown by the fan 6a and the elbows 23b arranged in the exchanger 22 are immersed in the fluid L heated by the engine 6 (oil extracted from the engine, or hydraulic fluid or aviation fuel to be cooled). By way of example, when the fluid L is oil, the temperature in the exchanger 22 is 80° C. whereas the temperature of the air flow P is of the order of 40° C.

In the example illustrated in FIG. 2, the heat pipe 23 is said to be open loop, with both ends blind. For the purposes of understanding only, and in order not to overburden FIG. 2, the heat pipe 23 depicted comprises four elbows 23b received in the exchanger 22 and three elbows 23b received in the acoustic sound attenuating structure 21. The blind ends of the heat pipe 23 are housed in the acoustic noise attenuating structure 21. The distance between the exchanger 22 and the acoustic noise attenuating structure 21 is, in this example, of the order of 30 to 50 cm.

It will be noted that the effectiveness of the heat pipe 23 increases with the increase in the number of elbows 23b. Thus, for preference, the heat pipe 23 comprises on the order of a dozen elbows, for example twelve, housed in the exchanger 22 and on the order of a dozen elbows 23b, for example eleven, housed in the acoustic noise attenuating structure 21.

At the acoustic noise attenuating structure 21, the heat pipe 23 passes, via several orifices 26, through the second panel 21c of the acoustic noise attenuating structure 21 and the elbows 23b are housed in the acoustic noise attenuating structure 21, supported by support partitions 25.

At the exchanger 22, the heat pipe 23 passes, via several orifices, through one of the walls 22b of the exchanger 22 and the elbows 23b of the heat pipe 23 extend into the exchanger 22 so as to be immersed in the circulating fluid L. The heat pipe 23 extends into the exchanger, depending on the configuration of the exchanger 22 and of the heat pipe 23, for example, either parallel or perpendicular to the direction of circulation of the fluid L.

In the case that air is flowing along the fan duct 200, the air flow P flows along the first panel 21a of the acoustic noise attenuating structure 21 and the perforations 28 allow some of the air P to enter the acoustic cavities 30. Each acoustic cavity 30 acts like a quarter-wave resonator and makes it possible to attenuate the noise emitted by the circulation of the air along the fan duct 200.

The elbows 23b of the heat pipe 23 which are arranged in the acoustic noise attenuating structure 21 are subjected to the temperature of the air flow P circulating in the fan duct 200. From a thermal standpoint, considering the heat circuit formed by the heat pipe 23, the exchanger 22 and the acoustic noise attenuating structure 21, the structure forms a condenser.

The elbows 23b of the heat pipe 23 that are arranged in the exchanger 22 are subjected to the temperature of the circulating fluid L. From a thermal standpoint, considering the heat circuit formed by the heat pipe 23, the exchanger 22 and the acoustic noise attenuating structure 21, the exchanger 22 forms an evaporator.

The fluid in the pulsating heat pipe is cooled in the condenser and heated in the evaporator. The temperature gradients generate pressure fluctuations associated with the generation, expansion and pulsation (the serpentine shape allows the bubbles of vapor in the condenser to pulse). These fluctuations lead to a pulsed circulation of the fluid allowing mass and therefore heat to be transferred between the condenser and the evaporator.

The invention allows a fluid-cooling system 20 to be incorporated into an acoustic noise attenuating structure 21, while at the same time moving the fluid L, the temperature of which is to be regulated away from the fan duct 200 in order to limit the risk of uncontrolled leakage into this duct.

The heat transfer fluid situated inside the tube 23a of the heat pipe 23 is a fluid compatible with aeronautical applications and extreme flight conditions (temperature, pressure, etc.), such as, for example, water, silver, lithium, sodium, ethanol, methanol. The heat-transfer fluid fills, for example, 50% of the total interior volume of the tube 23a.

The structural partitions and the heat pipe support partitions 24,25 of the acoustic sound attenuating structure 21 are made from a material that has high thermal conductivity, such as, for example, a metallic material.

The exchanger 22 is made from a metallic material such as, for example, titanium or aluminum, or else from a composite material.

As an alternative (not illustrated), the fluid-cooling system 20 comprises several heat pipes 23 as described hereinabove. The elbows 23b thereof which are arranged in the acoustic noise attenuating structure 21 are preferably arranged in the structure in a repeating pattern in order to be able to automate the assembly of the heat pipes 23 with the acoustic noise attenuating structure 21 during the manufacture of the latter.

Figure 4:
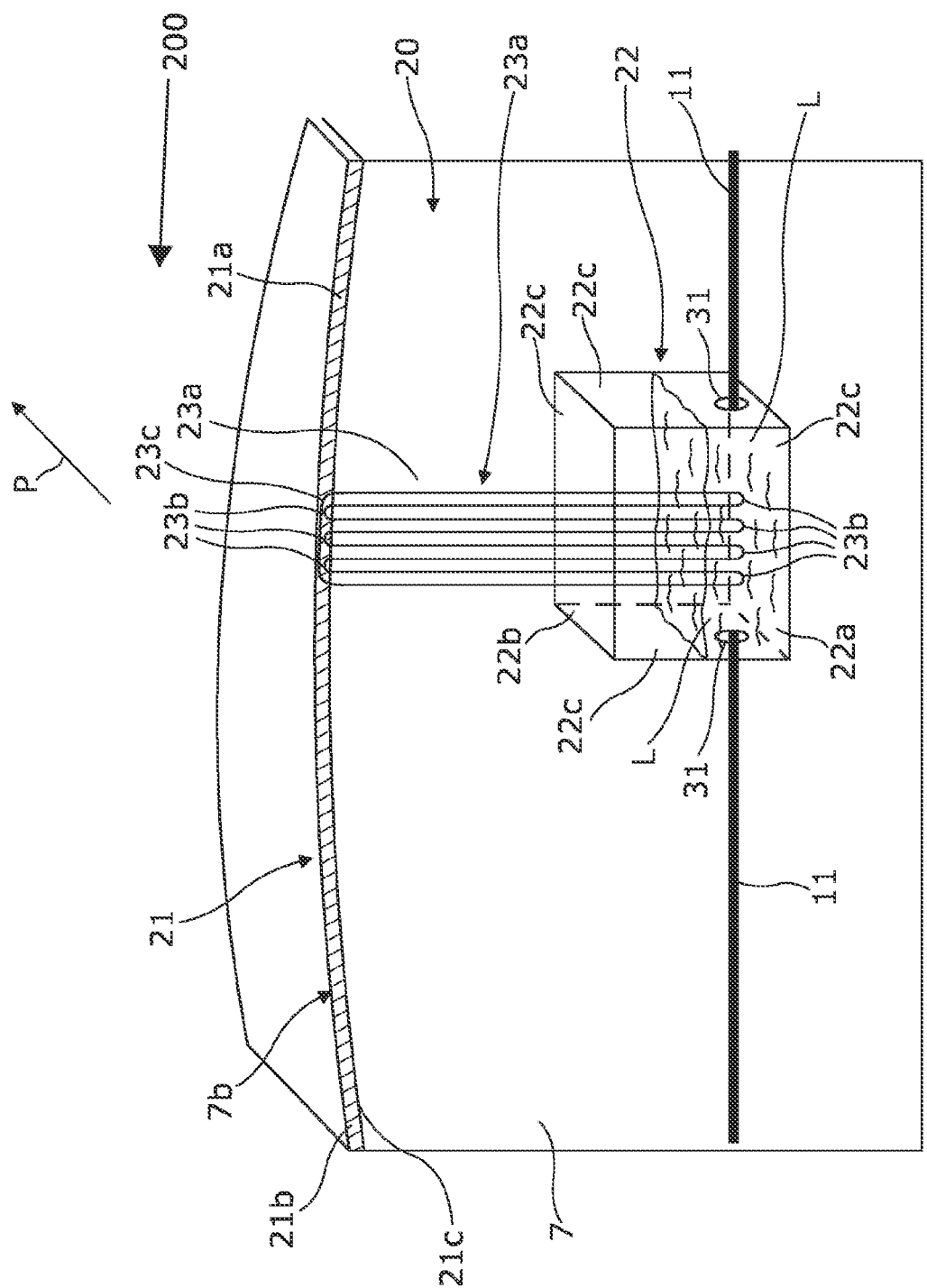
FIG. 4 is a view similar to FIG. 2, illustrating the thermo-acoustic system according to another embodiment of the invention.

In an alternative form of the invention, and with reference to FIG. 4, the heat pipe 23 is a closed-loop pipe and therefore does not have a blind end. In the example illustrated in FIG. 4, the heat pipe 23 comprises four elbows 23b housed in the exchanger 22 and three elbows 23b housed in the acoustic noise attenuating structure 21. A portion 23c, arranged in the acoustic noise attenuating structure, closes the loop of the tube 23a.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bypass turbomachine for an aircraft comprising:
an engine designed to turn a fan;
an annular interduct concentric with the engine;
a nacelle concentric with the annular interduct, the annular interduct and the nacelle between them defining a fan duct in which an air flow flows when the fan turns;
at least one fluid circuit, at least a portion which is disposed in the annular interduct and configured to cause a fluid that is to be cooled to pass towards or away from the engine;
the bypass turbomachine comprising a thermo-acoustic system associated with the at least one fluid circuit,
wherein the thermo-acoustic system comprises:
a heat exchanger arranged in the annular interduct, connected to the at least one fluid circuit, and through which the fluid passes,
an acoustic noise-attenuation structure forming, in full or in part, a wall of the interduct which is at least partially defining the fan duct, the acoustic noise attenuation structure being situated a first distance from the heat exchanger, and
a pulsating heat pipe comprising a tube extending, in a plane, between the heat exchanger and the acoustic noise-attenuation structure, the tube having a serpentine form with a plurality of elbows bent over at 180° housed alternately in the heat exchanger and the acoustic noise-attenuation structure,
wherein the pulsating heat pipe extends into the heat exchanger so as to be immersed in the fluid.

2. The bypass turbomachine according to claim 1, wherein the pulsating heat pipe is open-loop.

3. The bypass turbomachine according to claim 2, wherein the pulsating heat pipe has two blind ends.

4. The bypass turbomachine according to claim 1, wherein the acoustic noise-attenuation structure comprises:
a first panel in contact with the air flow circulating in the fan duct and having a plurality of perforations;
a second panel comprising a plurality of orifices for passage of the pulsating heat pipe;
a core comprising:
a plurality of structural partitions that, with the first panel and the second panel, form a network of acoustic cavities extending between the first panel and the second panel and in which each acoustic cavity of the network of acoustic cavities communicates with the fan duct via one or more perforations from the plurality of perforations, and
a plurality of support partitions, wherein one or more support partitions from the plurality of support partitions support respective one or more elbows from the plurality of elbows of the pulsating heat pipe that are housed in the acoustic noise-attenuation structure.

5. The bypass turbomachine according to claim 4, wherein each of the plurality of support partitions is fixed to each of the first and second panels and has an orifice through which the pulsating heat pipe passes.

6. The bypass turbomachine according to claim 4, wherein each of the plurality of support partitions is fixed to the second panel and has a free edge, distant from the first panel, configured to accept one of the one or more elbows of the pulsating heat pipe.

7. The bypass turbomachine according to claim 4, wherein the heat exchanger is situated at a second distance from the second panel.

8. The bypass turbomachine according to claim 1, the bypass turbomachine comprising two diametrically opposed forks connecting the nacelle and the annular interduct.

9. The bypass turbomachine according to claim 1, wherein the pulsating heat pipe is closed-loop.

10. A bypass turbomachine for an aircraft comprising:
an engine designed to turn a fan;
an annular interduct concentric with the engine;
a nacelle concentric with the annular interduct, the annular interduct and the nacelle between them defining a fan duct in which an air flow flows when the fan turns;
at least one fluid circuit, at least a portion of which is disposed in the annular interduct and configured to cause a fluid that is to be cooled to pass towards or away from the engine;
the bypass turbomachine comprising a thermo-acoustic system associated with the at least one fluid circuit,
wherein the thermo-acoustic system comprises:
a heat exchanger connected to the at least one fluid circuit and through which the fluid passes,
an acoustic noise-attenuation structure forming, in full or in part, a wall of the fan duct, the acoustic noise-attenuation structure being situated a first distance from the heat exchanger, and
a pulsating heat pipe comprising a tube extending, in a plane, between the heat exchanger and the acoustic noise-attenuation structure, the tube having a serpentine form with a plurality of elbows bent over at 180° housed alternately in the heat exchanger and the acoustic noise attenuation structure,
wherein the acoustic noise-attenuation structure comprises:
a first panel in contact with the air flow circulating in the fan duct and having a plurality of perforations;
a second panel comprising a plurality of orifices for passage of the pulsating heat pipe:
a core comprising:
a plurality of structural partitions that, with the first panel and the second panel, form a network of acoustic cavities extending between the first panel and the second panel and in which each acoustic cavity of the network of acoustic cavities communicates with the fan duct via one or more perforations from the plurality of perforations, and
a plurality of support partitions, wherein one or more support partitions from the plurality of support partitions support respective one or more elbows from the plurality of elbows of the pulsating heat pipe that are housed in the acoustic noise-attenuation structure.

* * * * *